3,432,500
DERIVATIVES OF ISOCYANURIC ACID
Daniel Porret, Binningen, Switzerland, assignor to Ciba Limited, Basel, Switzerland, a Swiss company
No Drawing. Filed Sept. 28, 1966, Ser. No. 582,554
Claims priority, application Switzerland, Oct. 6, 1965, 13,802/65
U.S. Cl. 260—248
Int. Cl. C07d 55/38; C08g 9/28
3 Claims

ABSTRACT OF THE DISCLOSURE

Derivatives of isocyanuric acid of the general formula

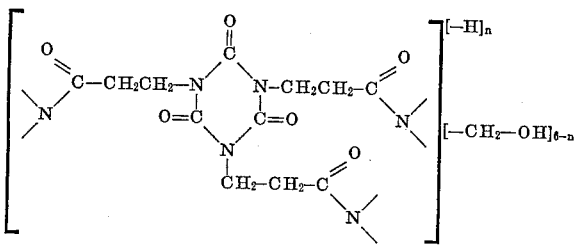

where $n = 3, 4, 5$ or $6$ are useful in improving textiles and in the manufacture of lacquers in molding powders.

---

The present invention provides new derivatives of isocyanuric acid of the general formula (I)

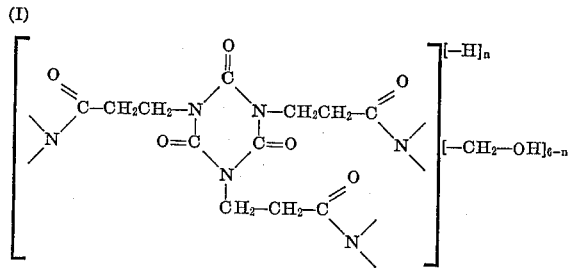

where $n = 3, 4, 5$ or $6$.

The new compound tris(carboxamidoethyl)isocyanurate ($n$ in Formula I = 6) is readily accessible by reacting 1 mol of cyanuric acid with 3 mols of acrylamide according to the reaction scheme (II)

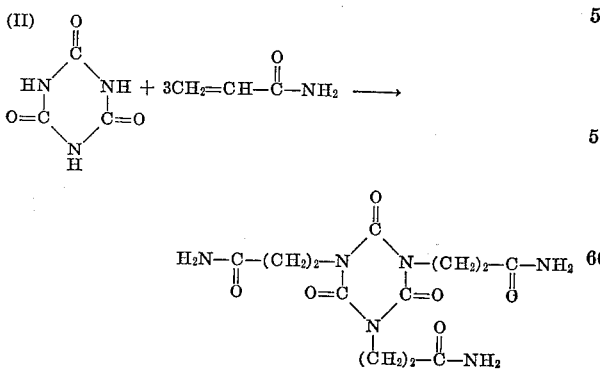

The reaction is advantageously performed in a suitable solvent, for example in dimethylformamide and in the presence of a catalyst, for example a quaternary ammonium base such as benzyltrimethylammonium hydroxide, preferably at a temperature ranging from 80 to 200° C. Furthermore, the reaction is advantageously carried out in an inert gas, especially nitrogen. The new triamide crystallizes out of the solvent during the reaction and can be filtered off after cooling. By recrystallization from dimethylformamide or water the new triamide can be obtained in pure form.

Alternatively, according to a less advantageous method the new triamide may also be prepared by hydrolyzing the corresponding, known trinitrile, but this route furnishes non-uniform products from which the pure triamide can be isolated only with difficulty.

Like other amides, the new triamide can be methylolated by known methods with formaldehyde or a formaldehyde donor, such as paraformaldehyde, and in this manner it is easy to fix up to 2 moles of formaldehyde per mol of the triamide.

The new methylolamides may be used in the same technical spheres as the known methylolamides, especially in improving textiles or in the manufacture of lacquers and moulding powders. In the cured state the new methylolamides are distinguished by a particularly good flexibility. The new triamide of the Formula II, used as intermediate in the manufacture of the new methylolamides, may also be used as it is, for example as filler for moulding powders or casting resins, to improve the flame-inhibiting and electrical properties.

Percentages in the following examples are by weight.

Example 1

(a) A mixture of 64.5 g. of cyanuric acid, 112 g. of acrylamide, 4 g. of a 40% solution of trimethylbenzylammonium hydroxide in methanol, 340 g. of dimethylformamide and 0.2 g. of hydroquinone is heated to 120° C. while being thoroughly stirred under nitrogen. After 2½ hours the cyanuric acid has dissolved completely, and after 10 hours the triamide begins to crystallize out. The mixture is then stirred on for another 10 hours at 120° C., then cooled, and the triamide is suctioned off and washed with 2×20 g. of dimethylformamide. The product is then dried in a vacuum drying cabinet at 70° C., to yield 85 g. of a white powder consisting of tris(carboxamidoethyl)isocyanurate. The 229 g. of mother liquor (including the washings) are used in the following experiment:

(b) A mixture of 64.5 g. of cyanuric acid, 108.6 g. of acrylamide, 1 g. of a 40% solution of trimethylbenzylammonium hydroxide in methanol, 0.2 g. of hydroquinone, 299 g. of mother liquor from experiment (a) and 50 g. of fresh dimethylformamide is heated to 120° C. while being thoroughly stirred under nitrogen. After 1½ hours the cyanuric acid has dissolved completely and after 5 hours the triamide begins to crystallize out. The mixture is stirred for another 7 hours at 120° C., then cooled, and the triamide is suctioned off and washed twice with 40 g. and once with 20 g. of dimethylformamide. The product is then dried at 70° C. under vacuum, to yield 165 g. of a white powder consisting of tris(carboxamidoethyl)isocyanurate. The yield amounts to 95% of the theoretical, referred to cyanuric acid. After having been recrystallized from water the substance melts at 299° C. and reveals the following data:

Found: C, 42.12; N, 24.41; H, 5.40%. Calculated for $C_{12}O_6N_6H_{18}$: C, 42.10; N, 24.55; H, 5.30%.

The remaining 360 g. of mother liquor may be used for the next experiment. Notwithstanding a certain discoloration of the mother liquor a considerable number of operations may be carried out successively with an equally good yield.

Example 2

The methylolated solution of the triamide prepared in Example 1 was manufactured in the following manner:

A mixture of 256.5 g. of tris(carboxamidoethyl)isocyanurate, 202 g. of aqueous formaldehyde of 36% strength and 150 g. of water is heated to 70° C., and its pH value is then adjusted to 7.5 to 8 by means of aqueous sodium hydroxide solution of 30% strength. The solution is gradually heated to 80 to 85° C. and stirred for 2½ hours at this temperature. After one hour the triamide has dissolved completely. During the reaction a few drops of sodium hydroxide solution should be added from time to time. A resin solution of 55% strength is obtained which may be used as a textile dressing agent. On drying the solution, a highly viscous resin is obtained which is still readily water-soluble. According to its analysis, only 2 mols of formaldehyde per mol of triamide have been fixed in the resin.

Example 3

A methylolated solution of the triamide prepared in Example 1, containing less combined formaldehyde than in Example 2, was prepared thus:

A mixture of 85.5 g. (=0.25 mol) of tris(carboxamidoethyl)isocyanurate, 25 g. of aqueous formaldehyde of 36% strength (=0.3 mol) and 30 g. of water is heated to 70° C. The pH value of the mixture is then adjusted with 2 drops of aqueous sodium hydroxide solution of 30% strength to 8. The solution is then heated to 85° C. and stirred for 3 hours at this temperature. During this time the pH value is maintained at 8 by occasional addition of one drop of the sodium hydroxide solution. After traces of undissolved matter have been filtered off, there is obtained a clear resin solution of 62% strength; it no longer contains any free bromine and may be used as a textile dressing agent.

Example 4

Bleached, very absorbent cotton fabric is impregnated to a weight increase of approximately 70% in the usual manner with a solution which contains, per litre, 150 g. of the 55% resin solution described in Example 2 and 5 g. of ammonium chloride, then dried at 80° C. and heat-set for 4 to 5 minutes at 155° C. The fabric treated in this manner is distinguished by a soft, pleasant handle and especially by improved crease resistance in the dry and in the wet state. The finish thus obtained will withstand several washes.

What is claimed is:

1. A derivative of isocyanuric acid of the formula

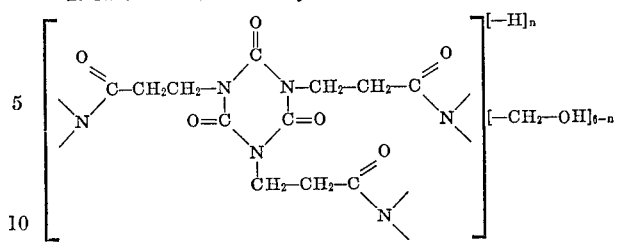

where $n$ is an integer of at least 3 and at the most 6.

2. Tris(carboxamidoethyl)isocyanurate of the formula

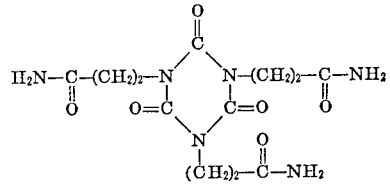

3. Bis(N - methylolcarboxamidoethyl)-(carboxamidoethyl)isocyanurate of the formula

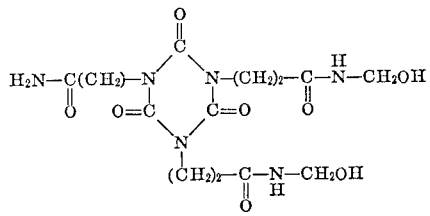

References Cited

UNITED STATES PATENTS 3,184,438    5/1965    Phillips et al. _____ 260—248

HENRY R. JILES, *Primary Examiner.*

JOHN M. FORD, *Assistant Examiner.*

U.S. Cl. X.R.

8—116.3; 117—139.4, 139.5; 260—29.4, 37, 67.6